United States Patent [19]

Rabe et al.

[11] Patent Number: 5,262,981
[45] Date of Patent: Nov. 16, 1993

[54] STORAGE OF INFORMATION UNITS IN THE NANOMETER RANGE

[75] Inventors: Juergen Rabe; Stefan Buchholz, both of Mainz; Harald Fuchs, Carlsberg, all of Fed. Rep. of Germany

[73] Assignee: BASF Aktiengesellschaft, Ludwigshafen, Fed. Rep. of Germany

[21] Appl. No.: 724,035

[22] Filed: Jul. 1, 1991

[30] Foreign Application Priority Data

Jul. 3, 1990 [DE] Fed. Rep. of Germany ....... 4021075

[51] Int. Cl.$^5$ .................... G11C 11/26; H01J 37/30
[52] U.S. Cl. .................... 365/120; 365/128; 365/114; 365/151; 156/345; 369/126
[58] Field of Search ............ 365/120, 128, 114, 151; 360/134; 156/345; 369/126

[56] References Cited

U.S. PATENT DOCUMENTS

| | | | |
|---|---|---|---|
| 3,750,117 | 7/1973 | Chen et al. | 365/128 |
| 4,287,572 | 9/1981 | Webster | 365/120 |
| 5,015,323 | 5/1991 | Gallagher | 156/345 |
| 5,038,322 | 8/1991 | Van Loenen | 365/114 |

FOREIGN PATENT DOCUMENTS 52-66576 4/1982 Japan.
60-191421 9/1985 Japan.

OTHER PUBLICATIONS

Lithography with the Scanning Tunneling Microscope, McCord et al. J. Vac. Soci. Tech., 1986, B4, 86–88.
Silver et al., Direct Writin of Submicron Metallic . . . , Appl. Phys. Lett. 51 1987, 247–249.
Surface Modification in the Nanometer . . . , J. Vac. Sci. Tech. A6(2), Mar./Apr. 1986, 537–539.
Atomic-Scale Surface . . . , Nature vol. 325, 1987, 419–421, Becker et al.
Direct Writing in Si with a Scanning . . . , Van Loenen et al., Appl. Phys. Lett., 55 (1989), 1312–1314.
Scanning Tunneling Microscope . . . , Kuk et al, Rev. Sci. Instrum. 60(2) Feb. 1989, 165–180.

Primary Examiner—Eugene R. LaRoche
Assistant Examiner—Viet Q. Nguyen
Attorney, Agent, or Firm—Keil & Weinkauf

[57] ABSTRACT

A process for the storage of information units in a nanometer range involves producing cup-like pits in a noble-metal surface.

4 Claims, 1 Drawing Sheet

STORAGE OF INFORMATION UNITS IN THE NANOMETER RANGE

BACKGROUND OF THE INVENTION

1. Field of the Invention

The present invention relates to a process for storing information units in the nanometer range by changing the shape of a noble-metal surface.

2. Description of the Related Art

The storage of information, in particular image and data signals, currently takes place predominantly using magnetic or optical recording carriers. The information density which can be achieved using these is determined by the smallest information units which can be written and re-read by the process. In conventional magnetic storage media, these units are determined by the size of the magnetic domains (Weiß domains), from a mechanical point of view by the head gap of the read/write heads used and by the distance of the read/write unit from the actual information carrier. In information carriers where the stored information is produced by a change in optical properties, the limit is the wavelength of the light used. The smallest information units here thus cannot be smaller than about half the wavelength of the light. An increase in storage density in optical recording carriers of this type has in the meantime also been achieved through optical near-field microscopy, where the optical read unit is only a few nanometers above the information-carrying surface. The best information densities achieved here at present are in the order of about 20 nm.

A further increase in the information density is only possible by using near-field techniques with a resolution in the subnanometer range. Suitable methods for this purpose are scanning probe techniques, including the scanning tunneling microscope and the atomic force microscope. These methods allow imaging of surfaces on an atomic scale. It has therefore been proposed to produce information storage media having the highest possible density, namely in the range of the individual atoms or molecules. Success in developing these media would result in information densities in the terabyte/$cm^2$ range.

A number of proposals have been made for storing information in the nanometer range on inorganic or organic surfaces, including M. A. McCord et al., J. Vac. Sci. Technol. B4, (1986), 86–88, R. M. Silver et al., Appl. Phys. Lett. 51 (1987), 247–249 and U. Staufer et al., J. Vac. Sci. Technol. A6 (1988), 537–539. The deposition of individual atoms has also been reported (R. S. Becker et al., Nature 325 (1987), 415–421).

However, all the proposals disclosed hitherto for the provision of maximum-resolution information storage media which also have, in particular, long-term stability and can be produced within an extremely short time are unsatisfactory.

SUMMARY OF THE INVENTION

It is therefore an object of the present invention to overcome said disadvantages and to provide a process for the storage of information units in the nanometer range using which time-stable and very rapid storage of information is possible.

We have found that this object is achieved by a process for the time-stable storage of information units in the nanometer range in which cup-like pits having a diameter of from 1 nm to 1 μm and a depth of less than 1000 nm are produced in a noble-metal surface by means of a surface-sensitive scanning probe.

DESCRIPTION OF THE PREFERRED EMBODIMENTS

The deformation of the conductive surface by means of the surface-sensitive scanning probe can be produced, in an embodiment according to the invention, by applying a short-duration electrical field by field desorption, point contact and delamination.

In a further embodiment, the storage of information units carried out in accordance with the process according to the invention can be reversed by thermal treatment, i.e. the information can be erased.

The process according to the invention proceeds from a noble-metal surface, for example the surface of a noble-metal monocrystal or the surface of a coating in a thickness of from 10 nm to 10 μm, in particular from 50 nm to 1 μm, produced on a solid substrate, e.g. mica, silicon or glass, by vapor-deposition of gold, platinum, palladium or, in particular, silver.

The atomic labeling is carried out in the surface of a silver coating of this type using the near-field technique, e.g. by means of a needle-shaped electrode of a surface-sensitive scanning probe, for example a scanning tunneling microscope, by applying a short-duration electrical field i.e. a voltage pulse shorter than 1 ms, in particular from 1 ps to 1 μs, and a voltage of from 1 to 6 volts. Since the area of the maximum electrical field of a scanning probe of this type is preferably from 100 nm to 1 nm on the conductive surface, the metal can be removed in this manner only in the affected area of the surface by instantaneous transfer onto the probe tip. This produces the cup-like pits, which can be utilized as time-stable labeling for information storage. A further essential feature here is that the measures can be carried out under normal ambient conditions, i.e., for example, in air and at room temperature.

The near-field technique used for writing the information can be conventional scanning tunneling microscopy or atomic force microscopy processes. The arrangement of these near-field techniques for characterizing surfaces is known and has been described (Y. Kuk et al., Rev. Sci. Instrum. 60(2) (1989), 165–180).

Figure 1:
FIG. 1 shows two lamellae in a coating of silver on mica.
Figure 2:
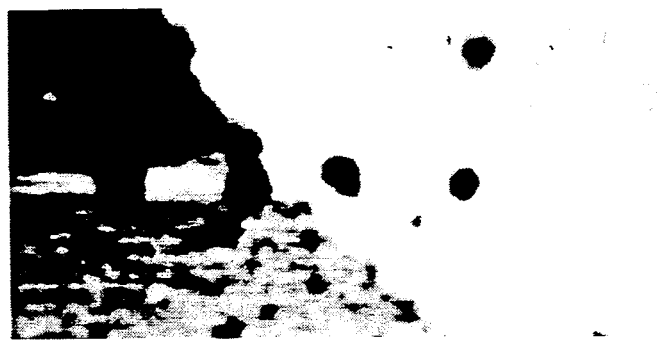
FIG. 2 shows the coating following detachment of a silver cluster according to the process of this invention.
Figure 3:
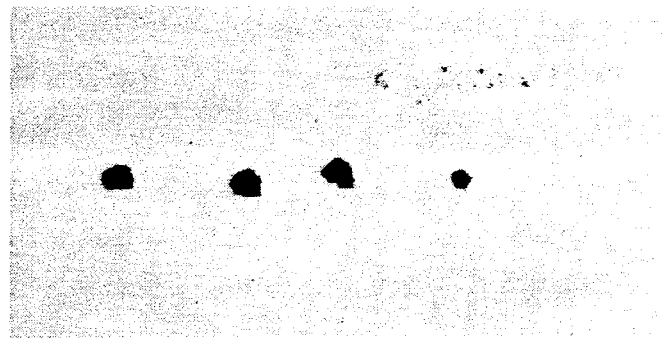
FIG. 3 shows FIG. 2 with an increase in contrast.

The process according to the invention is described in illustrative terms below:

Smooth lamellae of a 100 nm thick silver coating vapor-deposited epitaxially onto mica were imaged using a scanning tunneling microscope. FIG. 1 (140×63 rim) shows two lamellae of this coating having a roughness of 1 nm and a step height of 1 nm. Voltage pulses of 5 volts lasting 10 ns were applied to defect-free points of the coating. A rapid increase in current and withdrawal of the measurement needle by the control circuit indicated that metal-metal point contact had occurred briefly, resulting, on withdrawal of the needle, in detachment of a silver cluster having a diameter of 10 nm and a depth of 5 nm (FIG. 2). FIG. 3 shows FIG. 2 with an increase in contrast. The stability of the resultant pit in the silver surface allows the effect to be observed for more than one day.

We claim:

1. A process for the production of cup-like pits having a diameter of from 1 nm to 1 μm and a depth of less than 1000 nm in a noble metal surface by means of a surface-sensitive scanning probe, which process comprises supplying a voltage pulse shorter than 1 ms between the probe and the surface.

2. A process as claimed in claim 1, wherein the deformation of the surface is effected by field desorption, point contact and delamination.

3. A process as claimed in claim 1, wherein the noble-metal surface is a silver coating.

4. A process for erasing information units in the nanometer range which have been produced by producing cup-like pits in a noble-metal surface as claimed in claim 1 by means of a surface-sensitive scanning probe, which comprises reversing the deformation by thermal treatment.

* * * * *